United States Patent [19]

Wahlström

[11] Patent Number: 5,520,289
[45] Date of Patent: May 28, 1996

[54] DEVICE FOR SEPARATING INSULATION AND METALLIC MATERIAL

[76] Inventor: Yngve B. Wahlström, Gunsta, S-725 94 Västerås, Sweden

[21] Appl. No.: 326,039

[22] Filed: Oct. 19, 1994

[30] Foreign Application Priority Data

Oct. 19, 1993 [SE] Sweden .................. 9303439

[51] Int. Cl.⁶ .................................... B07B 4/00
[52] U.S. Cl. .................. 209/472; 209/481; 209/485; 209/506; 241/79.2
[58] Field of Search .................. 209/471, 472, 209/479, 480, 481, 485, 502, 503, 504, 506; 241/68, 69, 79.2

[56] References Cited

U.S. PATENT DOCUMENTS

| 853,917 | 5/1907 | Cliffard et al. ............ 209/472 X |
| 1,005,971 | 10/1911 | Hering ............................ 209/472 |
| 2,079,059 | 5/1937 | Winkleman ................ 209/481 X |
| 2,600,600 | 6/1952 | Yewell ........................ 209/472 X |
| 2,995,244 | 8/1961 | Schlicksupp ................ 209/472 X |
| 3,245,415 | 4/1966 | Koch et al. ............... 241/79.2 X |
| 4,316,799 | 2/1982 | Satake ........................ 209/480 X |

FOREIGN PATENT DOCUMENTS

| 0081072 | 6/1983 | European Pat. Off. . |
| 5368/69 | 8/1974 | Germany . |
| 2803684C2 | 7/1987 | Germany . |
| 31737 | 7/1908 | Sweden ...................... 209/472 |
| 1710146-A1 | 3/1970 | U.S.S.R. . |
| 1351-701-A | 11/1987 | U.S.S.R. . |
| 1537323 | 1/1990 | U.S.S.R. ..................... 209/481 |
| 4442 | of 1912 | United Kingdom ........... 209/472 |

*Primary Examiner*—William E. Terrell
*Assistant Examiner*—Tuan Nguyen
*Attorney, Agent, or Firm*—Barnes & Thornburg

[57] ABSTRACT

A device for separating lighter insulation material from heavier metallic material present in decomposed electric cables or the like, which device comprises an inlet (8) for mixed insulation and metallic material, and a first outlet for the insulation material and a second outlet for the metallic material, separate from the first outlet. The device further comprises a track (40) inclined relative to the horizontal plane, to which the mixed material is delivered from the inlet and which is profiled such that when a reciprocating movement is imparted thereto essentially in the plane of the track, the metal material is transported towards the upper end of the track where it is fed out through the second outlet while the insulation material is transported towards the lower end of the track where it is fed out through the first outlet.

16 Claims, 3 Drawing Sheets

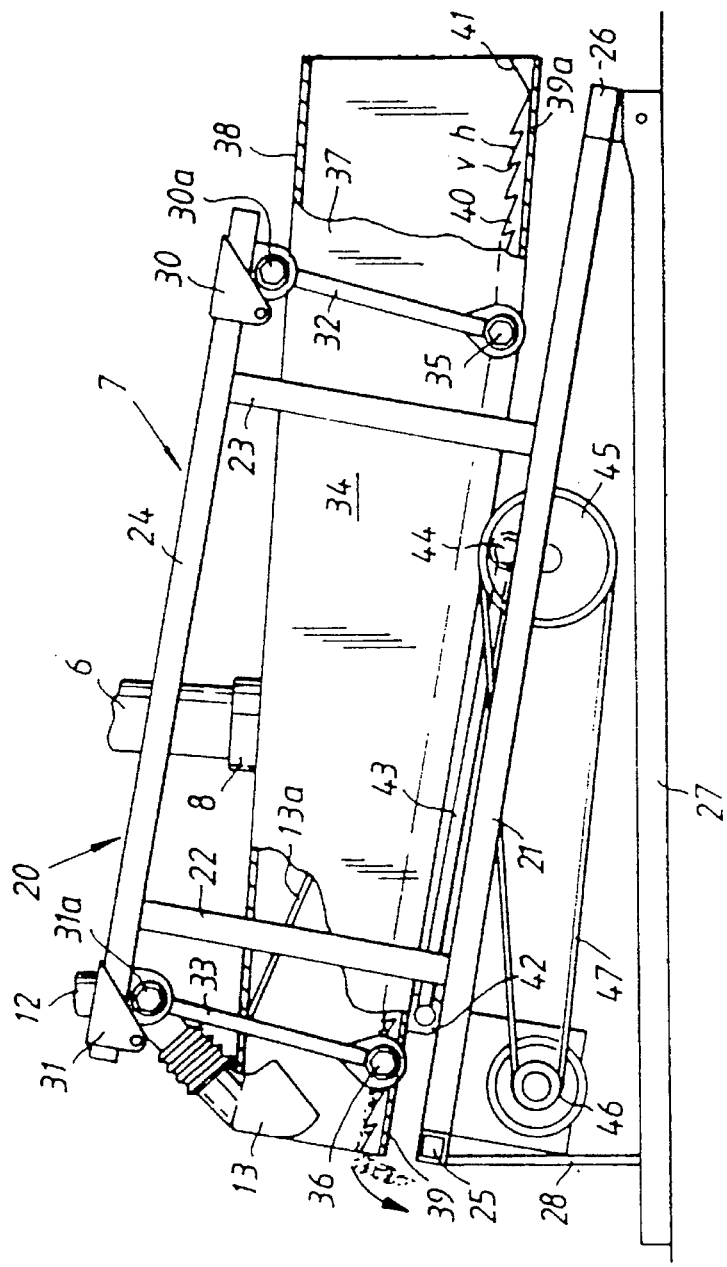

5,520,289

DEVICE FOR SEPARATING INSULATION AND METALLIC MATERIAL

TECHNICAL FIELD

The present invention relates to a device for separating lighter insulation material from heavier metallic material present in decomposed electric cables or the like, which device comprises an inlet for mixed insulation and metallic material, a first outlet for the insulation material and, separate therefrom, a second outlet for the metallic material.

1. Prior Art

Devices of the above-mentioned kind are previously known. Generally they include vibrating tables to which decomposed electric cable material is transported from a decomposition device, a so called granulator. The vibrating tables are bulky, complicated and inefficient. Since the granulator is separate from the vibrating tables, the installation as a whole will be bulky. Transportation of the decomposed material from the granulator to the vibrating tables is time-consuming and also involves the use of conveying equipment and manpower.

2. Description of the Invention

It is an object of the present invention to improve previously known devices and to provide an effective, space-saving device.

This object is achieved in that the device has been given the features stated in the characterizing portions of the claims.

DESCRIPTION OF THE FIGURES

FIG. 3 is a plan view, partly in section, seen obliquely from the front in FIG. 1 of some details incorporated in the unit 1 and 2.

PREFERRED EMBODIMENT

Figure 1:
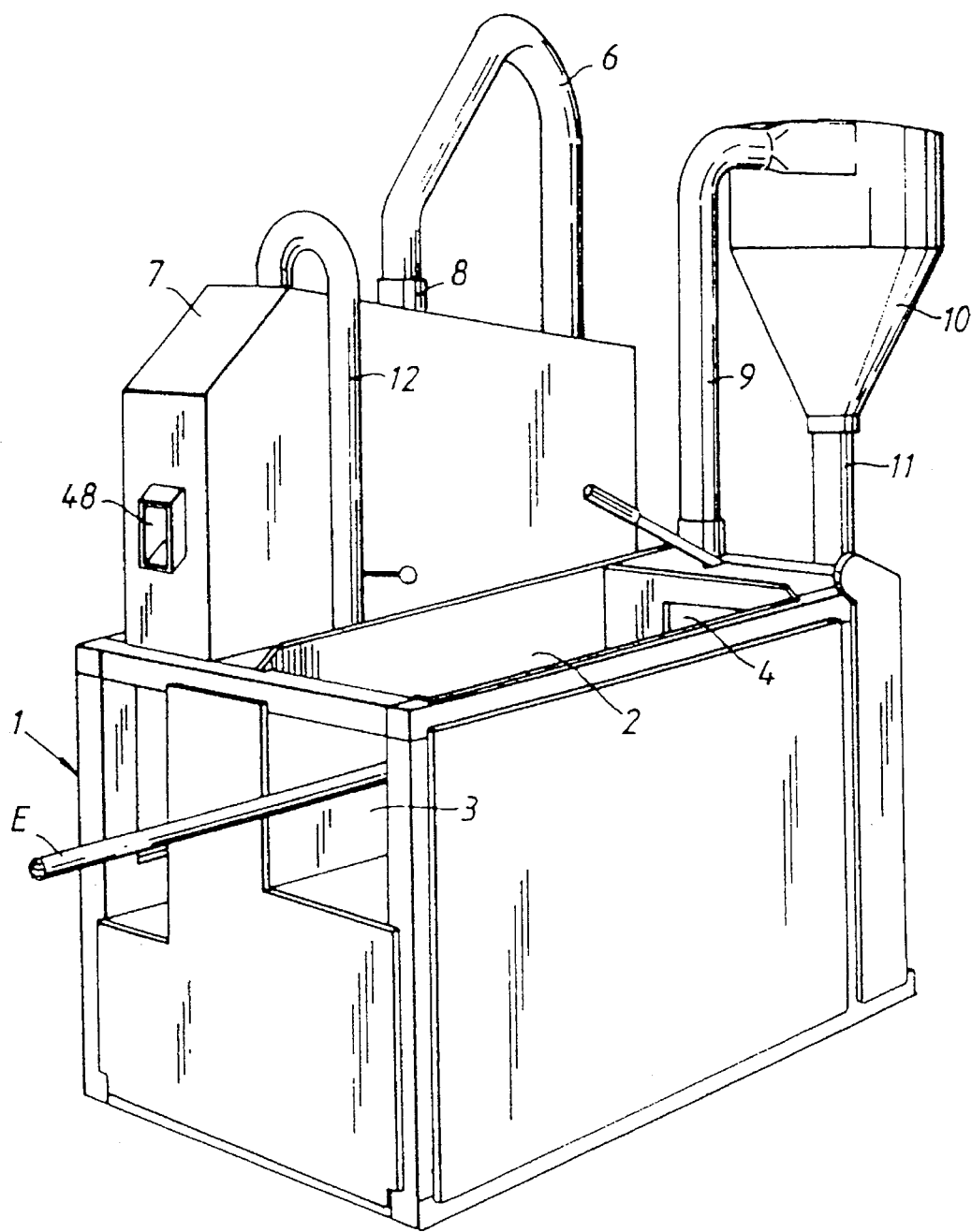
FIG. 1 is a perspective view of a unit including a device for the decomposition of electric cables and a separation device according to the present invention.
Figure 2:
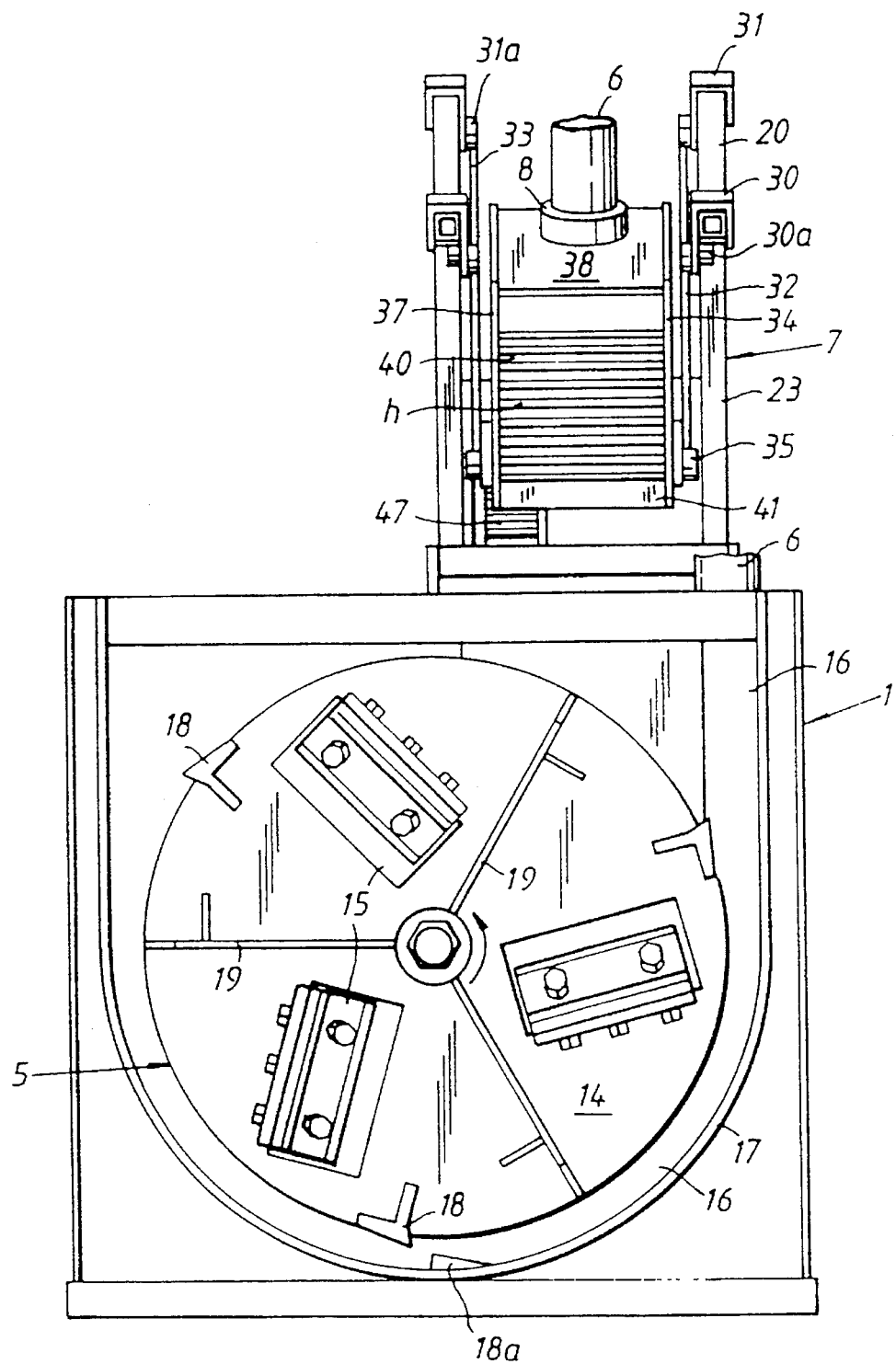
FIG. 2 is a plan view seen obliquely from the rear from the right-hand side in FIG. 1 of some details incorporated in the unit of FIG. 1.

In FIG. 1 the unit or machine including the device according to the invention is indicated at 1. The machine 1 has a bottom surface which is approximately as large as the supporting surface of a standard pallet, its height slightly exceeding the length of its longest side. The machine 1 is provided with a chamber 2 having two lateral openings 3 and 4 through which one or more electric cables, such as the electric cable E, with one or more cores of metal and and insulation, are intended to be passed to a decomposition device 5 located behind the opening 4 in FIG. 1, which decomposition device is shown in part in FIG. 2. The machine is provided with a duct 6 in which decomposed material is transported from the device 5 to the inlet 8 in a separation device 7, which is best shown in FIGS. 2 and 3. The machine is also provided with a duct 9 through which separated insulation material is transported from the decomposition device 5 at the right-hand end of FIG. 3 to a cyclone 10, in which the material is circulated and its velocity is decreased before it is fed out through the tube 11 for disposal. The machine 1 further includes a duct 12 through which air is blown from a fan (not shown) disposed in the machine adjacent the chamber 2 to a blow-off nozzle 13 in the separation device 7.

The decomposition device 5, shown in part in FIG. 2, includes a motor-driven wheel 14 with three cutting blocks 15 which cut the cable E fed in into thin circular pieces when the cable touches the rear side of the wheel in FIG. 2. The circular pieces fall into a chute 16 between the circumference of the wheel 14 and a housing 17 surrounding the wheel and are crushed or ground between one of three angle bars 18 projecting from the circumference of the wheel and a counterstay 18a attached to the housing. The ground material, consisting of small metal and insulation pieces which are not interconnected but intermixed, is fed by the angle bars 18 and three blades 19 attached to the wheel 14, which blades generate an air stream conveying the material pieces, up through the chute 16 and further through the duct 6 to the inlet 8.

The separation device 7 includes a frame 20 consisting of two substantially identical and parallel lateral pieces, each of which consists of four tubes 21–24. The two lower tubes 21 are interconnected at their ends by means of further tubes 25 and 26. The tube 26 is rotatably mounted to a portion 27 of the stand of the machine 1 such that the inclination of the frame 20 can be set at a suitable angle relative to the horizontal plane, represented by the stand portion 27. After setting, a support means 28 is inserted between the tube 25 and the portion 27.

Each of the two upper tubes 24 of the frame 20 is provided with two holders 30 and 31 slidable along the tube, which holders are lockable in different positions on the tube. Each holder 30, 31 is provided with a flexibly suspended bearing 30a, 31a, in which the upper end of a pendulum arm 32 and 33, respectively, is pivotally mounted. The lower end of each pendulum arm 32, 33 is pivotally mounted to the lower portion of a box 34 via flexibly suspended bearings 35 and 36, respectively. The box 34 is substantially parallelepipedic but its cross section is slightly smaller at the left-hand portion thereof in FIG. 3. The box has two identical side walls 37, a cover 38 and a base 39. In the cover 38 there is a hole for the inlet 8. The casing of the machine 1, which surrounds the box 34, is provided with an outlet opening 48 the lower edge of which is located adjacent and in alignment with the left-hand end edge of the base 39 according to FIG. 3.

The base 39 of the box 34 is constantly inclined relative to the horizontal plane with the exception of a portion 39a on the right-hand side of FIG. 3, which portion is somewhat less inclined relative to the horizontal plane. A track 40 is attached to the base 39, which track covers the entire base and is profiled. The track 40 suitably consists of some elastic material such as hard rubber, and the profiling is zigzag- or, saw-tooth-shaped with the profiles formed by said shape located across the longitudinal axis of the box 34. The right-hand end of the track 40 in FIG. 3 is terminated by a stop lug 41.

The base 39 of the box 34 is provided with an elastic mounting 42 connected with a rod 43 which is rotatably connected with an eccentric 44 on a flywheel 45 driven by an electric motor 46 via a grooved belt 47. The motor 46 also operates the fan not shown, which feeds air to the duct 12 and the blow-off nozzle 13 as well as to the duct 9 and the cyclone 10.

A brief description of the operation of the device according to the invention will be given below.

Electric cable E fed in by a person through the openings 3 and 4 is cut and ground by the decomposition device 5. The decomposed material is transported through the duct 6 by means of compressed air and is fed out of the inlet 8, which is located in the upper, central portion of the box 34. The material falls onto the inclined track 40 to which is imparted a reciprocating movement essentially in the longitudinal direction of the box 34 (track 40) by the means 42–47 while the pendulum arms 32, 33, which support the box, reciprocate on the frame 20. The reciprocating movement is reversed 300–800 times/minute, preferably around 500 times/minute. At the same time, the box 34 receives a movement component in the vertical direction, which is relatively small but which in certain cases may contribute towards increased separation efficiency.

Owing to the metallic material being heavier than the insulation material it will collect at the bottom on the track 40 while the latter is moving. On each movement of the track towards the right according to FIG. 3, the metallic material will slide on the surfaces h set at a small angle relative to the horizontal plane on the saw-tooth-shaped profiles and will fall into the spaces located to the left thereof between the surfaces h and adjacent substantially vertical surfaces v on the profiles. On the subsequent movement of the track towards the left, the metallic material will be prevented by the surfaces v from being removed from said spaces. The transfer of the metallic material taking place obliquely upwards in FIG. 3 further implies that both the metallic material and the insulation material will be redistributed, which in turn causes the insulation material mixed with the metallic material to be pressed upwards from the track.

The track 40 forms an angle of 5°–20°, preferably around 10°, with the horizontal plane (portion 27). The surfaces h each form an angle of 10°–30°, preferably 20°, with the track 40. The surfaces v each form an angle of 60°–90°, preferably around 75°, with the track 40. The distance between two in the plane of the track 40 adjacent points of intersection between the two surfaces v and h is 5–15 mm, preferably around 11 mm, and the distance between two essentially transversely to the plane of the track located points of intersection between the two surfaces is 2–10 mm, preferably around 5 mm.

During the movement of the track 40, the insulation material lying on the metallic material, in the case where the metallic material entirely fills the spaces between the surfaces h and v, owing to the effect of said movement and of the gravitation, will slide towards the right-hand end of the track for feeding out through the right-hand opening of the box 34. Similarly a certain amount of excess metallic material may be fed towards the right on the track. To prevent such material from being fed out through the right-hand opening of the box 34 too, the inclination of the track 40 relative to the horizontal plane has been reduced at the portion 39a, and the stop lug 41 has been added.

To render the separation more effective, air is blown out through the nozzle 13 and is diverted obliquely downwards towards the track 40 by a plate 13a which is oriented obliquely downwards to the right in FIG. 3 and is attached to the cover 38. The velocity, flow and direction of the air are selected such that it will help to move the insulation material towards the right-hand end of the track 40 without conveying any significant amounts of metallic material. At the right-hand portion of the track 40 a vacuum may suitably be provided, but the effect of the air on the material here is insignificant.

When a large amount of insulation material has collected on the track 40 to the left of the stop lug 41 in FIG. 3, the insulation material will be fed out thereover and will fall into a space (not shown), wherefrom it will be transported by means of air through the duct 9 and out through the tube 11 via the cyclone 10.

The metallic material transported obliquely upwards in FIG. 3 by the track 40, which metallic material has been freed of insulation material, is finally fed out at the left-hand end of the track through the outlet opening 48.

The movement pattern of the box 34 may be altered either by displacing the holders 30 and 31 along the rods 24 and locking them in other positions thereon or by changing the inclination of the frame 20 relative to the stand portion 27.

While only one embodiment of the present invention has been described above and shown in the drawings, it will be appreciated that the invention is not limited to said embodiment but only by what is stated in the claims.

I claim:

1. A device for separating lighter insulation material from heavier metallic material present in decomposed electric cables, which device comprises an inlet for mixed insulation and metallic material, a first outlet for the insulation material, a second outlet for the metallic material which outlet is separate from the first outlet, and a track inclined relative to the horizontal plane, to which the mixed material is delivered from the inlet, the track having an area at a lower end thereof having a first incline and an area above the lower end thereof having a second incline relatively greater than the first incline such that when a reciprocating movement is imparted thereto essentially in the plane of the track and an air stream is oriented towards the lower end of the track and essentially along the track, the metallic material is transported towards an upper end of the track where it is fed out through the second outlet while the insulation material is transported towards the lower end of the track where it is fed out through the first outlet.

2. A device according to claim 1, wherein an air-delivering device generates the air stream oriented towards the lower end of the track and wherein at least one of the orientation, flow and velocity of the air stream is adjustable such that essentially only the insulation material is conveyed towards the first outlet.

3. A device according to claim 1, wherein the inclination of the track is adjustable, and the inclination is mainly constant with the exception of an area at the lower end of the track which is inclined to a lesser degree than the rest of the track.

4. A device according to claim 1, wherein the profile of the track is substantially saw-tooth-shaped.

5. A device according to claim 1, wherein the track forms the bottom of a box provided with side walls and a cover, which box is open at the upper and lower ends, forming the two outlets at said ends.

6. A device according to claim 1, wherein the track is suspended by means of pendulum arms in a frame and the pendulum arms are displaceably adjustable relative to at least one of the frame and the track to alter the movement pattern of the track.

7. A device according to claim 1, wherein a substantially reciprocating movement is imparted to the track by a motor, which is connected with the track via an eccentric and a rod, which is flexibly connected with the track.

8. A device according to claim 1, wherein an air delivering device generates the air stream oriented towards the lower end of the track and the air delivering device includes a blow-off nozzle attached at the upper end of the track.

9. A device according to claim 1, wherein the inlet is located above the track approximately equidistantly from the two ends thereof.

10. A device according to claim 1, wherein the inlet is connected with an electric cable decomposition device from which the decomposed material is transported to the inlet by means of air, through a duct.

11. A device according to claim 10, wherein the device is joined to the decomposition device into one unit.

12. An electric cable decomposition device including a device for separating lighter insulation material from heavier metallic material present in decomposed electric cables, which device comprises an inlet for mixed insulation and metallic material, a first outlet for the insulation material, a second outlet for the metallic material which outlet is separate from the first outlet, and a track inclined relative to the horizontal plane, to which the mixed material is delivered from the inlet, the track having an area at a lower end thereof having a first incline and an area above the lower end thereof having a second incline relatively greater than the first incline such that when a reciprocating movement is imparted thereto essentially in the plane of the track and an air stream is oriented towards the lower end of the track and essentially along the track, the metallic material is transported towards an upper end of the track where it is fed out through the second outlet while the insulation material is transported towards the lower end of the track where it is fed out through the first outlet.

13. A device according to claim 12, wherein the track is suspended by means of pendulum arms in a frame and the pendulum arms are displaceably adjustable relative to at least one of the frame and the track to alter the movement pattern of the track.

14. A device according to claim 12, wherein a substantially reciprocating movement is imparted to the track by a motor, which is connected with the track via an eccentric and a rod, which is flexibly connected with the track.

15. A device according to claim 12, wherein an air delivering device generates the air stream oriented towards the lower end of the track and the air delivering device includes a blow-off nozzle attached at the upper end of the track.

16. A device according to claim 12, wherein the device is joined to the decomposition device into one unit.

* * * * *